United States Patent
Chalbos et al.

(10) Patent No.: US 11,705,961 B2
(45) Date of Patent: Jul. 18, 2023

(54) METHOD AND SYSTEM FOR ACHIEVING WIRELESS COMMUNICATION BETWEEN A SENDER DEVICE AND A RECEIVER DEVICE BY MEANS OF A REPEATER DEVICE, WITHOUT LOSS OF INFORMATION ON A PHYSICAL PROPERTY

(71) Applicant: SIGFOX, Labege (FR)

(72) Inventors: Nicolas Chalbos, Eaunes (FR); Loïc Hubert, Saint-Sulpice-sur-Lèze (FR); Arnaud Mansuy, Toulouse (FR)

(73) Assignee: SIGFOX, Labege (FR)

( * ) Notice: Subject to any disclaimer, the term of this patent is extended or adjusted under 35 U.S.C. 154(b) by 171 days.

(21) Appl. No.: 17/426,871

(22) PCT Filed: Jan. 28, 2020

(86) PCT No.: PCT/EP2020/051982
§ 371 (c)(1),
(2) Date: Jul. 29, 2021

(87) PCT Pub. No.: WO2020/157033
PCT Pub. Date: Aug. 6, 2020

(65) Prior Publication Data
US 2022/0109494 A1    Apr. 7, 2022

(30) Foreign Application Priority Data

Feb. 1, 2019    (FR) .......................... 19 00995

(51) Int. Cl.
    *H04B 7/15*     (2006.01)
    *H04B 7/155*    (2006.01)

(52) U.S. Cl.
    CPC ............................. *H04B 7/15542* (2013.01)

(58) Field of Classification Search
    CPC .............................. H04B 7/15542; H04B 7/14
    See application file for complete search history.

(56) References Cited

U.S. PATENT DOCUMENTS

| | | | |
|---|---|---|---|
| 2006/0153132 | A1 | 7/2006 | Saito |
| 2012/0257532 | A1* | 10/2012 | Nakada ............... H04B 7/2606 370/252 |
| 2018/0062803 | A1 | 3/2018 | Zirphile et al. |
| 2018/0102861 | A1* | 4/2018 | Ashworth .......... H04B 7/15578 |
| 2018/0376391 | A1* | 12/2018 | Lotter .................. H04W 36/06 |
| 2020/0389225 | A1 | 12/2020 | Peleg et al. |
| 2021/0153033 | A1 | 5/2021 | Peleg et al. |

* cited by examiner

*Primary Examiner* — Hashim S Bhatti
(74) *Attorney, Agent, or Firm* — H&I Partners; C. Andrew Im; Jean-Christophe Hamann (57) ABSTRACT

A method for achieving wireless communication between a transmitter and a receiver via a repeater device. The value of a first physical property of a message received from the transmitter is measured by the repeater device. The value of a second physical property to be used for the retransmission of the message is determined by the repeater device depending on the value of the first physical property measured for the received message. The message is retransmitted to the receiver by the repeater device using the determined value of the second physical property.

11 Claims, 5 Drawing Sheets

“METHOD AND SYSTEM FOR ACHIEVING
WIRELESS COMMUNICATION BETWEEN A
SENDER DEVICE AND A RECEIVER
DEVICE BY MEANS OF A REPEATER
DEVICE, WITHOUT LOSS OF
INFORMATION ON A PHYSICAL
PROPERTY”

RELATED APPLICATIONS

This application is a § 371 application of PCT/EP2020/051982 filed Jan. 28, 2020, which claims priority from French Patent Application No. 19 00995 filed Feb. 1, 2019, each of which is incorporated herein by reference in its entirety.

FIELD OF THE INVENTION

The present invention relates to the field of digital telecommunications, and more particularly relates to a method and a system for wireless communication between a transmitter device and a receiver device via a repeater device.

BACKGROUND OF THE INVENTION

Conventionally, a repeater device can be implemented, for example, to increase the range of a wireless communication system comprising terminals and a wireless access network comprising a plurality of base stations. More specifically, for various reasons, terminals can sometimes be out of range of the base stations, such that the messages transmitted by these terminals cannot be received by the wireless access network.

In such a case, a repeater device can be provided, placed for example between said terminals and a base station of said wireless access network, such that said repeater device is configured to receive the messages transmitted by the terminals, and such that the wireless access network is configured to receive the messages transmitted by the repeater device. In such a case, the repeater device retransmits the messages previously received from said terminals to the wireless access network, such that the terminals can exchange messages with said wireless access network via said repeater device.

One drawback is that certain pieces of information, relating to a physical property of the received messages, can be lost when implementing such repeater devices. Yet, such information can be of use for certain applications, in particular for position determination.

For example, the receiving times of the same message received by a plurality of receiver devices and/or repeater devices of known respective geographical positions allow the geographical position of the transmitter device that transmitted said message to be estimated. When retransmitting the message, the information on the value of the receiving time of said message received by the repeater device can be lost.

Similarly, the received powers of the same message received by a plurality of receiver devices and/or repeater devices of known respective geographical positions allow the geographical position of the transmitter device to be estimated. However, because the messages are amplified by the repeater device, the information on the value of the received power of said message received by the repeater device can be lost.

In yet another example, the receiving frequencies of the same message by a plurality of receiver devices and/or repeater devices of known respective geographical positions allow the geographical position of the transmitter device to be estimated (by techniques known as "Frequency Difference of Arrival" or FDOA). When retransmitting the message, the information on the value of the receiving frequency of said message received by the repeater device can be lost, in particular if the repeater device retransmits the received message on a frequency that is different from that on which it received said message.

One possible solution is to add, in the data included in the received message, additional data representative of the value of the physical property considered (for example the receiving time, received power, receiving frequency, etc.).

However, such a solution involves demodulating and fully decoding each received message, adding the additional data, and then re-encoding and re-modulating everything (data originally included in the received message and the additional data). Thus, the computational complexity can be high if the number of messages to be retransmitted is significant. In particular, for applications of the M2M (Machine-to-Machine) or IoT (Internet of Things) type, the number of terminals liable to transmit messages to be retransmitted can be very high, and can require a too great computational complexity.

Furthermore, such a solution involves increasing the amount of data included in each message, and thus increasing the duration of each message. However, in M2M and IoT applications, the duration of each message must preferably be kept to a minimum.

Finally, sometimes additional data cannot be added to the data included in the received message. This is in particular the case when the data included in the received message comprise payload data and control data, the control data being included for security purposes and being determined from said payload data and a private key that is a priori not known to the repeater device. In such a case, the addition of additional data by the repeater device could compromise the security of the wireless communication system.

OBJECT AND SUMMARY OF THE INVENTION

The purpose of the present invention is to overcome all or part of the limitations of the solutions of the prior art, in particular those described hereinabove, by proposing a solution that preserves, during retransmission, information related to a physical property of a received message, without having to increase the duration of said message during the retransmission.

To this end, and according to a first aspect, the invention relates to a method for wireless communication between a transmitter device and a receiver device via a repeater device, said transmitter device transmitting a message in a frequency band which is received by the repeater device, the repeater device retransmitting the received message in the frequency band to the receiver device. The method comprises the steps of:

measuring, with the repeater device, the value of a first physical property of the message received from the transmitter device, determining, with the repeater device and as a function of the value of the first physical property measured for the received message, the value of a second physical property to be used for the retransmission of the message, the second physical property being different from the first physical property, retransmitting, with the repeater device, the message to the receiver device, using the value of the second physical property determined as a function of the value of the first physical property measured for the received message.

Thus, for each received message, the repeater device measures the value of the first physical property considered, which is liable to be lost during the retransmission of said message. Using the measured value, the repeater device determines the value of a second physical property, which is different from the first physical property, to be used when retransmitting the message. The first physical property and the second physical property are different, i.e., they are of different respective types. For example, the time (for example the receiving time or the retransmission time of the message), the frequency, the power and the phase correspond to four physical properties of different types.

For example, the first physical property corresponds to the receiving time of the message received by the repeater device, and the second physical property corresponds to the frequency on which said message is retransmitted. Thus, the repeater device measures the receiving time of the message, determines the retransmission frequency as a function of the receiving time of said message, and retransmits said message on the determined retransmission frequency. A receiver device that receives the retransmitted message can thus estimate the time at which the repeater device received this message as a function of the frequency on which this message was retransmitted by the repeater device.

In another example, the first physical property corresponds to the received power of the message received by the repeater device, and the second physical property corresponds to the frequency on which the message is retransmitted. Thus, the repeater device measures the received power of the message, determines the retransmission frequency as a function of the received power of the message, and retransmits said message on the determined retransmission frequency. A receiver device that receives the retransmitted message can thus estimate the power with which the repeater device received this message as a function of the frequency on which this message was retransmitted by the repeater device.

The value of the first physical property of the received message is liable to be lost, in particular if the number of possible values for the first physical property during retransmission is very low. Encoding the value of the first physical property of the received message in the value of a second physical property of the retransmitted message is thus advantageous if the number of possible values for the second physical property during retransmission is higher.

For example, if the first physical property corresponds to the receiving time of a message, and if the repeater device does not immediately retransmit each received message (for example because it collects messages during a collection window of a predetermined duration in order to retransmit them simultaneously), then the information about the receiving time of each message is lost. More specifically, there is only one possible retransmission time for all of the messages received during the collection window. Encoding this information in another physical property of the retransmitted message, for example in the retransmission frequency of the message, is thus advantageous.

According to another example, if the first physical property corresponds to the received power of a message, and if the repeater device retransmits each received message with a predefined retransmit power, which is the same for all of the messages, then the information about the received power of each message is lost. More specifically, there is only one possible retransmit power, regardless of the received power of said message. Encoding this information in another physical property of the retransmitted message, for example in the retransmission frequency of the message, is thus advantageous.

Moreover, only the second physical property of the retransmitted message is used to encode the value of the first physical property. As a result, no additional datum is added to the data included by the transmitter device in the received message. More specifically, the transmitter device forms data that are encoded and modulated into a message which takes the form of a radio-frequency signal. These data are retransmitted unchanged by the repeater device, and without adding additional data that would also be encoded and modulated according to the same protocol as for the data transmitted by the transmitter device. The duration of the retransmitted message is thus the same as that of the received message. Only the value of the second physical property of the retransmitted message is affected by the invention. This second physical property, which did not carry any information in the prior art, is advantageously used to encode the value of the first physical property of the received message.

According to specific embodiments, the wireless communication method can further comprise one or more of the following features, which must be considered singly or according to any combinations technically possible.

In specific implementations, the value of the second physical property of the retransmitted message is determined such that a difference between said value of the second physical property of said retransmitted message and a predetermined reference value of said second physical property is representative of a difference between a reference value of the first physical property and the value of said first physical property measured for the received message.

In specific implementations, the wireless communication method comprises a step of forming and of transmitting, with the repeater device, a reference message using the reference value of the second physical property.

In specific implementations, the wireless communication method comprises steps of:
  measuring, with the receiver device, the value of the second physical property of the message received from the repeater device,
  determining, with the receiver device, the value of the first physical property of the message received by the repeater device as a function of the value of the second physical property measured for the message received by the receiver device.

In specific implementations, the first physical property is the time at which the message is received by the repeater device, and the second physical property is one of the following physical properties:
  the frequency on which said message is retransmitted,
  the power with which said message is retransmitted, and
  the phase with which said message is retransmitted.

In specific implementations, the first physical property is the power with which the message is received by the repeater device, and the second physical property is one of the following physical properties:
  the time at which said message is retransmitted,
  the frequency on which said message is retransmitted, and
  the phase with which said message is retransmitted.

In specific implementations, the first physical property is the frequency on which the message is received by the repeater device, and the second physical property is one of the following physical properties:

the time at which said message is retransmitted,
the power with which said message is retransmitted, and
the phase with which said message is retransmitted.

According to a second aspect, the present invention relates to a repeater device configured to receive a message transmitted in a frequency band by a transmitter device and to retransmit the received message in said frequency band to a receiver device. The repeater device comprises means configured to:
measure the value of a first physical property of the message received from the transmitter device,
determine, as a function of the value of the first physical property measured for the received message, the value of a second physical property to be used for the retransmission of said message, the second physical property being different from the first physical property, and
retransmit the message to the receiver device (20), using the value of the second physical property determined as a function of the value of the first physical property measured for the received message.

In specific embodiments, the repeater device can further comprise one or more of the following features, which must be considered singly or according to any combinations technically possible.

In specific embodiments, the repeater device is configured to determine the value of the second physical property of the retransmitted message such that a difference between said value of the second physical property of said retransmitted message and a predetermined reference value of said second physical property is representative of a difference between a reference value of the first physical property and the value of said first physical property measured for the received message.

In specific embodiments, the repeater device comprises means configured to form and transmit a reference message using the reference value of the second physical property.

According to a third aspect, the present invention relates to a wireless communication system comprising a receiver device and a repeater device according to any of the embodiments of the invention, and the receiver device comprises means configured to:
measure the value of the second physical property of the message received from the repeater device, and
determine the value of the first physical property of the message received by the repeater device as a function of the value of the second physical property measured for the message received by the receiver device.

BRIEF DESCRIPTION OF THE FIGURES

The invention will be better understood after reading the following description, intended for purposes of illustration only and not intended to limit the scope of the invention, given with reference to the figures which show.

In these figures, identical reference numerals in one or another figure denote identical or similar elements. For clarity purposes, the elements shown are not to scale, unless specified otherwise.

DETAILED DESCRIPTION OF EMBODIMENTS

Figure 1:
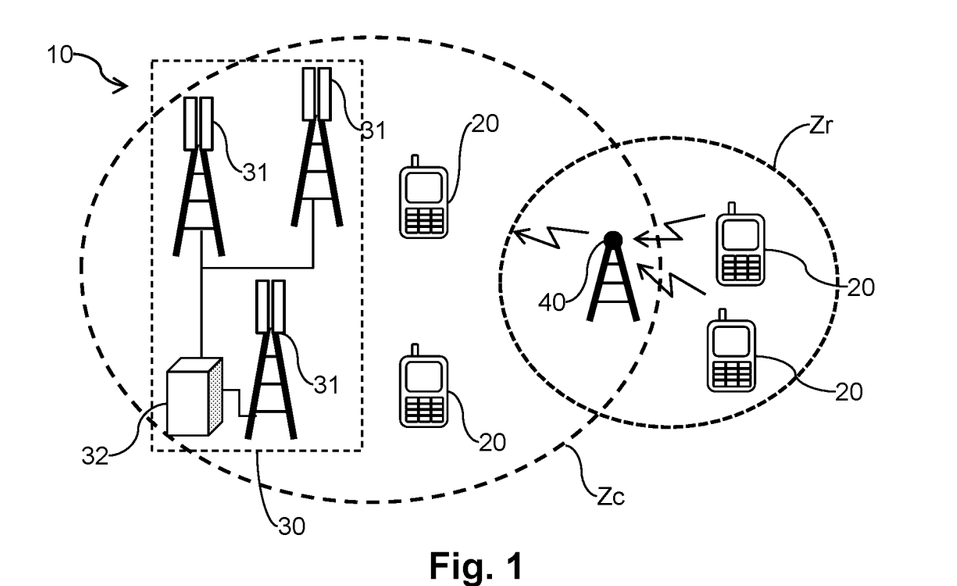
FIG. 1 is a diagrammatic view of an example embodiment of a wireless communication system.

FIG. 1 diagrammatically shows a wireless communication system 10 comprising a plurality of terminals 20 and an access network 30 comprising a plurality of base stations 31.

The terminals 20 and the base stations 31 of the access network exchange messages in the form of radio-frequency signals. The term "radio-frequency signal" must be understood herein to mean an electromagnetic wave propagating via non-wired means, the frequencies whereof lie in the conventional spectrum of radio-frequency waves (several hertz to several hundred gigahertz).

The terminals 20 are, for example, configured to transmit messages over an uplink to the access network 30 in a predefined frequency band. The frequency band used over the uplink is preferably an Industrial, Scientific and Medical (ISM) band, for example with frequencies below 1 gigahertz. Each base station 31 is configured to receive the messages from the terminals 20 that are located within range thereof. Each message thus received is, for example, transmitted to a server 32 of the access network 30, potentially accompanied by other information such as an identifier for the base station 31 that received it, or the frequency of said received message, etc. The server 32 processes, for example, all of the messages received by the base stations 31.

Moreover, the access network 30 can also be configured to transmit, via the base stations 31, messages over a downlink to the terminals 20, which are configured to receive them where appropriate. The messages are transmitted over the downlink in a predefined frequency band. The frequency band used over the downlink can be different from the frequency band used over the uplink, or the same frequency band can be used over both the uplink and the downlink.

As shown in FIG. 1, some terminals 20 are out of range of the access network 30, i.e., they are outside a coverage area Zc of the access network 30. To enable these terminals 20 to exchange messages with the access network 30, the wireless communication system 10 comprises a repeater device 40, which is located in the coverage area Zc.

Preferably, the repeater device 40 is located on the Earth's surface. "Located on the Earth's surface" is understood to mean that the repeater device 40 is located at an altitude of less than or equal to 25 kilometres. In particular, the repeater device 40 is thus not on-board a satellite orbiting the Earth. Preferably, all or part of the base stations 31 and all or part of the terminals 20 are also located on the Earth's surface.

The description hereinbelow relates, in a non-limiting manner, to the case where the repeater device 40 is implemented over the uplink, i.e., in order to receive messages transmitted by terminals 20 and to retransmit them to the access network 30.

However, according to other examples, the implementation of the repeater device 40 over the downlink is not excluded, i.e., in order to receive messages transmitted by base stations 31 and to retransmit them to the terminals 20.

Generally speaking, the repeater device 40 can be implemented over the uplink and/or the downlink.

The repeater device 40 can implement more or less complex processing operations. The choice of a specific type for the repeater device 40 merely constitutes an alternative implementation of the invention.

The repeater device 40 is configured to receive, in the frequency band of the uplink, the messages from the terminals 20 that are located within its range (represented by a coverage area Zr in FIG. 1). The received messages are retransmitted, in the frequency band of the uplink over which said messages were received, to the access network 30. The retransmitted messages are received by at least one base station 31 within range of which the repeater device 40 is located.

Preferably, the messages retransmitted by the repeater device 40 are formatted according to the same communication protocol as the messages transmitted by the terminals 20. Thus, a base station 31 receives the messages retransmitted by the repeater device 40 in the same way as the messages received from the terminals 20 within its range, and thus as if they had been received directly from the terminals 20 outside its range. In other words, the same receiver of the base station 31 is used to receive each message transmitted over the uplink, whether it is a message transmitted by a terminal 20 or a message retransmitted by the repeater device 40.

Figure 2:
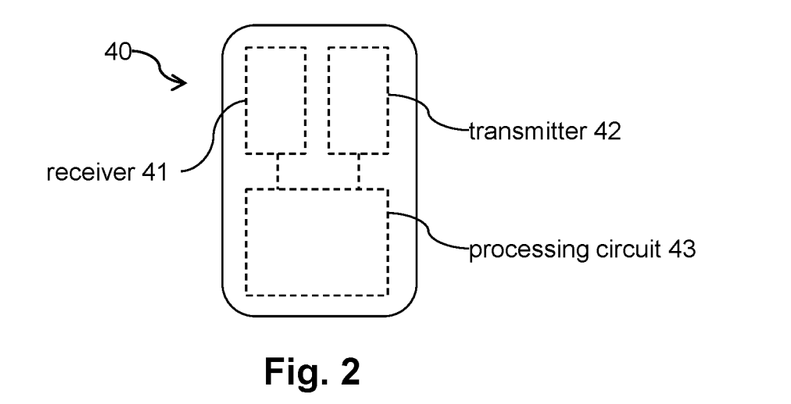
FIG. 2 is a diagrammatic view of an example embodiment of a repeater device.

FIG. 2 diagrammatically shows a non-limiting example embodiment of a repeater device 40. As shown in FIG. 2, the repeater device 40 comprises a receiver 41, a transmitter 42 and a processing circuit 43.

The receiver 41 is configured to receive the messages transmitted over the uplink and the transmitter 42 is configured to (re)transmit messages over the uplink. The receiver 41 and the transmitter 42 in particular comprise respective radio circuits comprising equipment (antenna, amplifier, local oscillator, mixer, analogue filter, etc.) known to a person skilled in the art.

The processing circuit 43 is configured to implement the necessary processing operations after receipt by the receiver 41, and before (re)transmission by the transmitter 42, and in particular to implement, with the receiver 41 and the transmitter 42, the steps which concern the repeater device 40 of a wireless communication method 50 which will be described hereinbelow. The processing circuit 43 comprises, for example, one or more processors and storage means (magnetic hard drive, electronic memory, optical disc, etc.) in which a computer program product is stored, in the form of a set of program code instructions to be executed. Alternatively or additionally, the processing circuit 43 comprises one or more programmable logic devices (FPGA, PLD, etc.), and/or one or more application-specific integrated circuits (ASIC, etc.), and/or a set of discrete electronic components, etc.

In other words, the processing circuit 43, the receiver 41 and the transmitter 42 correspond to means configured as software (specific computer program product) and/or hardware (FPGA, PLD, ASIC, discrete electronic components, radio circuit, etc.) to implement the steps concerning the repeater device 40 of a wireless communication method 50 described hereinbelow.

Figure 3:
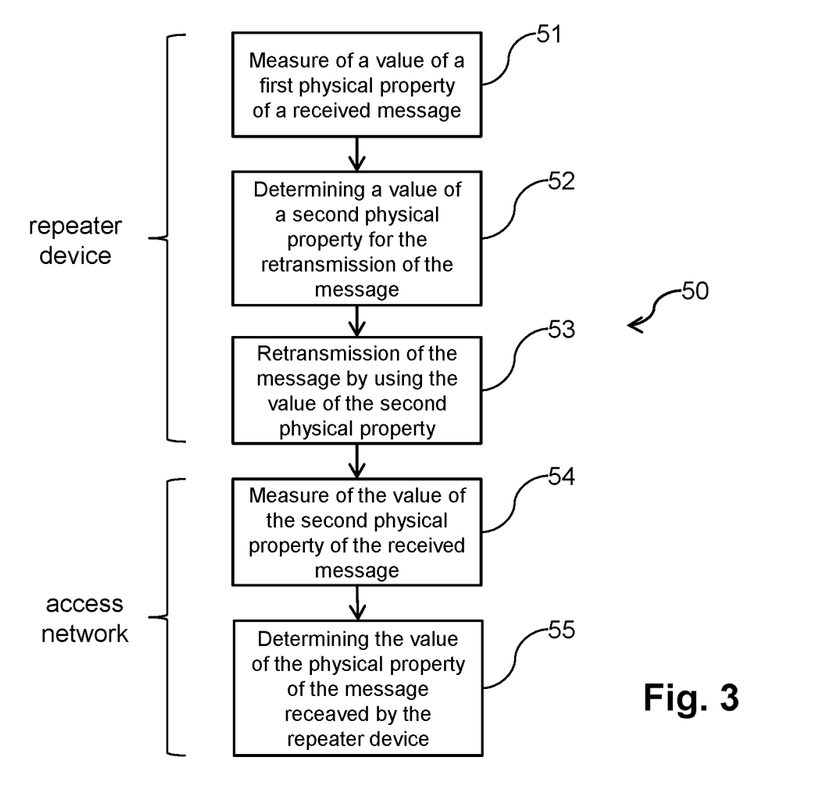
FIG. 3 is a diagram showing the main steps of a wireless communication method.

FIG. 3 diagrammatically shows the main steps of a wireless communication method 50 between the terminals 20 and the access network 30, via the repeater device 40.

As shown in FIG. 3, the wireless communication method 50 comprises steps of:

51 measuring, with the repeater device 40, the value of a first physical property of a message received from a transmitting device 20;

52 determining, with the repeater device 40 and as a function of the value of the first physical property measured for the received message, the value of a second physical property to be used for the retransmission of said message, the second physical property being different from the first physical property; and 53 retransmitting, with the repeater device 40, the message to at least one base station 31 of the access network 30, using the value of the second physical property determined as a function of the value of the first physical property measured for the received message.

Thus, for each received message, the repeater device 40 measures the value of the physical property considered, which is liable to be lost during the retransmission of said message. Using the measured value, the repeater device 40 determines the value of a second physical property to be used when retransmitting the message. The first physical property and the second physical property are different, i.e., they are of different respective types. For example, the time (for example the receiving time or the retransmission time of the message), the frequency, the power and the phase correspond to four physical properties of different types.

In other words, the repeater device 40 converts the first physical property of the received message into a second physical property of the retransmitted message, the value of the second physical property of the retransmitted message being representative of the value of the first physical property of the received message.

As shown in FIG. 3, the wireless communication method 50 can further comprise, if the access network 30 is configured to determine the value of the first physical property of the message received by the repeater device 40, the steps of:

54 measuring, with the access network 30, the value of the second physical property of the message received from the repeater device 40; and 55 determining, with the access network 30, the value of the first physical property of the message received by the repeater device 40 as a function of the value of the second physical property measured for the message received by the access network 30.

The message retransmitted by the repeater device 40 is received by at least one base station 31 of the access network 30. By measuring the value of the second physical property of the message received by a base station 31, a parameter is obtained which is representative of the value of the second physical property used by the repeater device 40 to retransmit this message. Since the value of the second physical property used in the retransmission has been determined from the value of the first physical property of the message received by the repeater device 40 by applying a function known to the access network 30, it is understood that the access network 30 can estimate the value of the first physical property from the value of the second physical property measured for the message received from the repeater device 40.

Non-limiting example implementations of the wireless communication method 50 will now be described, considering different combinations of physical properties for the first physical property and for the second physical property.

A) Receiving Time-to-Retransmission Frequency Conversion

Figure 4:
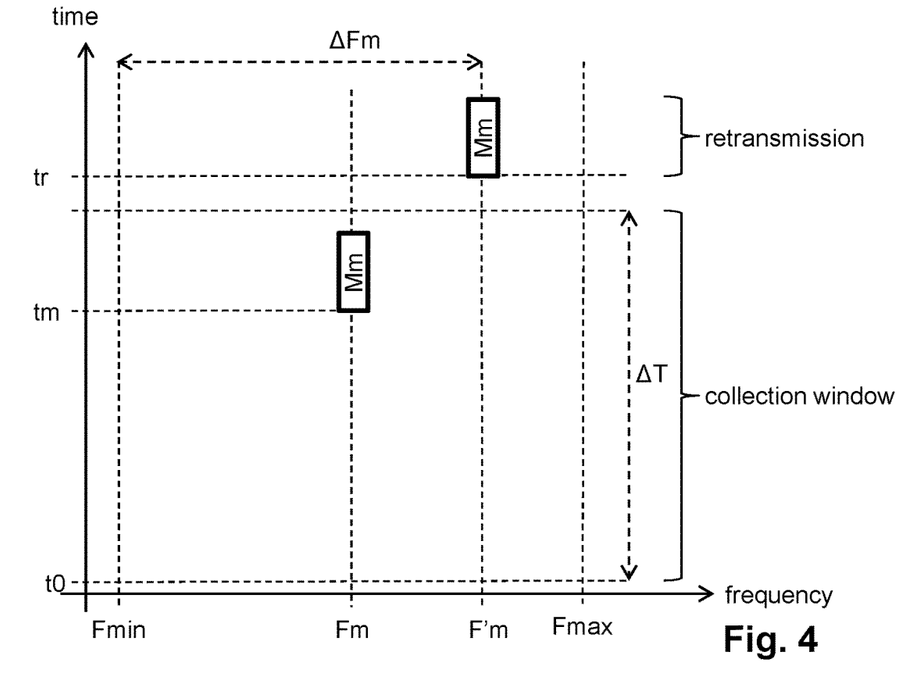
FIG. 4 is a diagram showing the operation of a first example implementation of the wireless communication method in FIG. 3.

According to a first non-limiting example, the first physical property corresponds to the time at which the message is received by the repeater device 40, and the second physical property corresponds to the frequency on which said repeater device 40 retransmits said message.

The description hereinbelow relates, in a non-limiting manner, to the case where the repeater device 40, rather than immediately retransmitting each received message, begins by collecting messages transmitted by terminals 20 throughout the duration of a collection window. However, this implementation is also applicable when the repeater device 40 immediately retransmits each received message.

The duration of the collection window must allow for the collection of at least two messages that are not received simultaneously by the repeater device 40. As a result, the duration of the collection window is advantageously at least twice as long as a reference duration of the messages transmitted by the terminals 20. If all of the messages have the same duration, then the reference duration corresponds to the duration of each message. If the messages are not all of the same duration, the reference duration corresponds to the minimum duration that a message transmitted by a terminal 20 can last. In preferred implementations, the duration of the collection window is at least five times the reference duration of the messages, or even at least ten times said reference duration.

After collecting messages for the duration of the collection window, the repeater device 40 retransmits the received messages. According to a non-limiting example, the repeater device 40 can simultaneously retransmit at least two messages that were not simultaneously received, in order to reduce the time occupancy of said messages when retransmitted by said repeater device 40. If necessary, the repeater device 40 preferably retransmits all of the received messages simultaneously, in order to minimise the time occupancy required for retransmission.

FIG. 4 diagrammatically shows a spectrogram, i.e., a frequency/time representation of the radio-frequency signals in the frequency band used for the transmission and retransmission over the uplink of messages by the terminals 20 and by the repeater device 40.

As shown in FIG. 4, the collection window, considered to be of duration $\Delta T$, starts at a time t0. The repeater device 40 receives, at a time tm (tm>t0), a message Mm transmitted by a terminal 20, on a frequency Fm within the frequency band of the uplink.

During the measurement step 51, the repeater device 40 measures the receiving time tm of the message Mm and then determines, during the determination step 52 and as a function of the receiving time tm, the frequency F'm on which said message must be retransmitted to the access network 30. The retransmission frequency F'm, which depends on the receiving time tm of the message Mm, is thus usually different from the frequency Fm on which said message Mm was received by the repeater device 40. Then, the repeater device 40 retransmits the message Mm at a time tr (tr≥t0+$\Delta T$) and on the frequency F'm determined as a function of the time tm.

During the determination step 52, the retransmission frequencies are determined such that two messages received at different times are retransmitted on different frequencies. Preferably, the function used to determine the retransmission frequencies is such that a frequency within the frequency band of the uplink corresponds to only one receiving time within the collection window. Optionally, a plurality of frequencies within the frequency band of the uplink can correspond to the same receiving time within the collection window. More specifically, if two messages are received at the same time on two different frequencies, they cannot be retransmitted simultaneously on the same frequency (except possibly in the case of code division multiple access). By associating a plurality of possible frequencies with the same receiving time within the collection window, these two messages can thus be retransmitted on different respective frequencies, both of which are representative of the time at which these two messages were received simultaneously.

In preferred implementations, the retransmission frequencies of the messages are determined such that a frequency difference between a retransmission frequency of a message and a predetermined reference frequency is representative of a time difference between a reference time and the receiving time of said message received by the repeater device 40. The reference time is, for example, the time t0 of the beginning of the collection window, the time (t0+$\Delta T$) of the end of said collection window, a predefined time within the collection window, or the retransmission time tr of the message, etc. The reference frequency is, for example, the minimum frequency Fmin of the frequency band of the uplink, the maximum frequency Fmax of the frequency band of the uplink, or a predefined frequency within the frequency band of the uplink, etc.

The description hereinbelow relates, in a non-limiting manner, to the case where the reference time corresponds to the time t0 at which the collection window begins, and where the reference frequency corresponds to the minimum frequency Fmin of the frequency band of the uplink. For example, the frequency difference is proportional to the time difference. For a message Mm received at a time tm, the frequency difference $\Delta Fm$ determining the retransmission frequency F'm (F'm=Fmin+$\Delta Fm$) is, for example, determined according to the following expression:

$$\Delta Fm = (F\max - F\min) \times (tm - t0)/\Delta T.$$

The message Mm retransmitted by the repeater device 40 is received by at least one base station 31 of the access network 30. By measuring the receiving frequency of said message received by a base station 31, an estimate is obtained of the retransmission frequency F'm of this message retransmitted by the repeater device 40. Since the retransmission frequency F'm of the message retransmitted by the repeater device 40 has been determined from the receiving time tm of said message Mm by applying a function known to the access network 30, it is thus understood that the access network 30 can estimate this receiving time tm from the measurement of the receiving frequency of the message Mm received from the repeater device 40.

In the case described hereinabove, wherein the frequency difference at a reference frequency is representative of the time difference between the receiving time and a reference time, several possibilities can be envisaged for determining the receiving time tm of the message Mm received by the repeater device 40.

In particular, the reference time, if not known by the access network 30, can be indicated for example in a reference message formed and transmitted by the repeater device 40. Alternatively, and in a non-limiting manner, the access network 30 can estimate the reference time from the time trx at which the retransmitted message Mm was received by a base station 31. For example, if the reference time corresponds to the time t0 when the collection window starts, and considering that the access network knows the duration $\Delta T$ of the collection window, the reference time can be estimated to be equal to (trx−$\Delta T$) by making the following assumptions:

the propagation delay between the repeater device 40 and the access network 30 is negligible (such that trx≈tr), and the elapsed time between the time (t0+ΔT) when the collection window ends and the time tr when the messages are retransmitted by the repeater device 40 is negligible (such that (t0+ΔT)≈tr).

The repeater device 40 can further include in a reference message information enabling the access network 30 to estimate the reference time, such as, for example, the duration ΔT of the collection window, the elapsed time between the time when the collection window ends and the time tr when the message Mm is retransmitted, etc.

Figure 5:
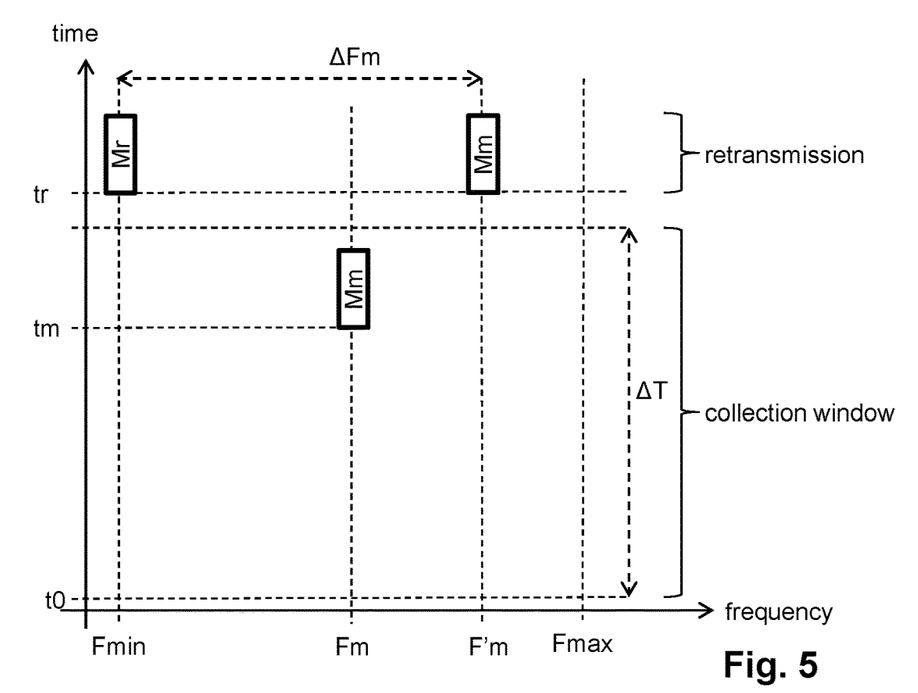
FIG. 5 is a diagram showing the operation of a second example implementation of the wireless communication method in FIG. 3, FIGS. 6A-C are diagrams showing the operation of a third example implementation of the wireless communication method in FIG. 3, and FIGS. 7A-C are diagrams showing the operation of a fourth example implementation of the wireless communication method in FIG. 3.

The reference frequency, if not known by the access network 30, can be indicated for example in a reference message formed and transmitted by the repeater device 40. Alternatively, the repeater device 40 can form a reference message (which can include information useful for estimating the reference time) and transmit it directly on the reference frequency, which is within the frequency band of the uplink where appropriate. Such transmission of a reference message Mr on the reference frequency is advantageous in that it allows the access network 30 to estimate a possible error created by the repeater device 40 regarding the generation of the frequencies. By measuring the receiving frequency of the reference message, and by comparing this receiving frequency to the reference frequency as generated by the access network 30, the frequencies of the repeater device 40 and of the base station 31 that received the reference message can be synchronised. Such frequency synchronisation allows the frequency difference applied by the repeater device 40 to be estimated with greater accuracy, and thus the receiving time tm of the message Mm received by the repeater device 40 to be estimated with greater accuracy.

FIG. 5 diagrammatically shows a spectrogram containing the same elements as in FIG. 4, and which also shows a reference message Mr which is transmitted simultaneously with the retransmitted message Mm, on the reference frequency which corresponds in this example to the minimum frequency Fmin of the frequency band of the uplink.

B) Receiving Time-to-Retransmit Power Conversion

Figure 6A:
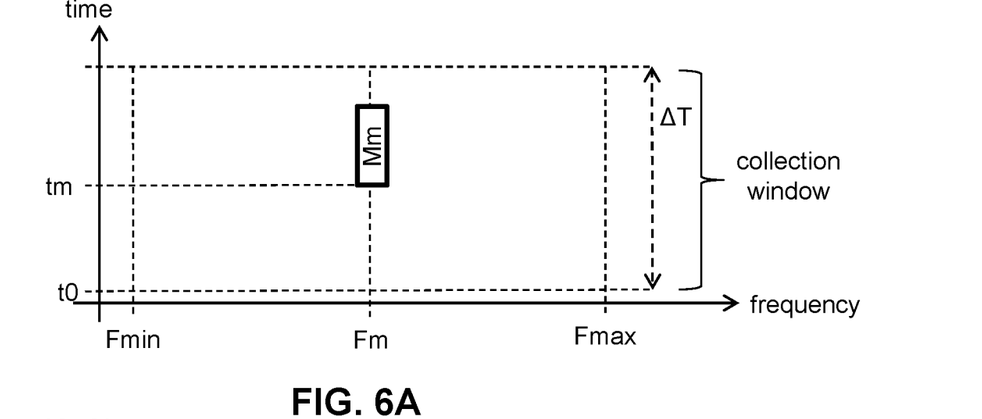

According to a second non-limiting example, the first physical property corresponds to the time at which the message is received by the repeater device 40, and the second physical property corresponds to the power with which said repeater device 40 retransmits said message.

The description hereinbelow relates, in a non-limiting manner, as described hereinabove with reference to FIG. 4, to the case where the repeater device 40, rather than immediately retransmitting each received message, begins by collecting messages transmitted by terminals 20 throughout the duration of a collection window. However, this implementation is also applicable when the repeater device 40 immediately retransmits each received message.

Figure 6B:
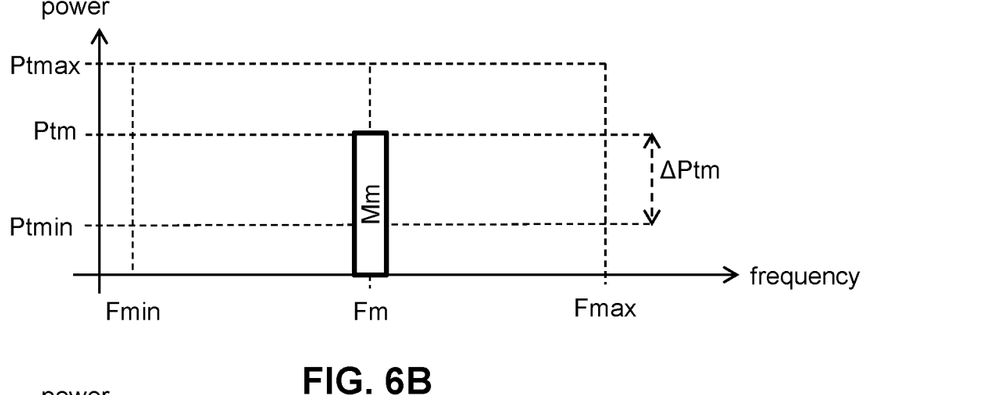
Figure 6C:
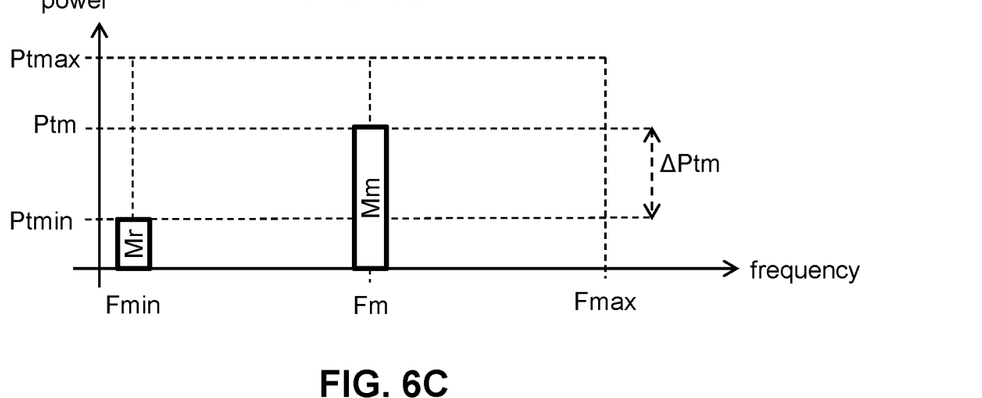

FIGS. 6A-C diagrammatically show an example implementation of the receiving time-to-retransmit power conversion. More particularly, FIG. 6A shows a spectrogram, i.e., a frequency/time representation of the radio-frequency signals in the frequency band used for the transmission and retransmission over the uplink of a message by a terminal 20 and by the repeater device 40. FIG. 6B shows a power frequency spectrum of the message retransmitted by the repeater device 40.

As in FIG. 4, the repeater device 40 receives, at a time tm (tm>t0), a message Mm transmitted by a terminal 20, on a frequency Fm within the frequency band of the uplink. The repeater device 40 retransmits the message Mm at a time tr (tr≥t0+ΔT), for example on the same frequency Fm as that on which said message was received.

During the measurement step 51, the repeater device 40 measures the receiving time tm of the message Mm. The repeater device 40 then determines, during the determination step 52 and as a function of the receiving time tm, the power Ptm with which the message must be retransmitted to the access network 30.

During the determination step 52, the retransmit powers are determined such that two messages received at different times are retransmitted with different powers.

In preferred implementations, the retransmit powers of the messages are determined such that a power difference between a retransmit power of a message and a predetermined reference power is representative of a time difference between a reference time and the receiving time of said message received by the repeater device 40. As seen hereinabove, the reference time is, for example, the time t0 of the beginning of the collection window, the time (t0+ΔT) of the end of said collection window, a predefined time within the collection window, or the retransmission time tr of the message, etc. The reference power is, for example, a maximum retransmit power Ptmax, a minimum retransmit power Ptmin, or a predefined power between the maximum power Ptmax and the minimum power Ptmin, etc.

The description hereinbelow relates, in a non-limiting manner, to the case where the reference time corresponds to the time t0 at which the collection window begins, and where the reference power corresponds to the minimum retransmit power Ptmin. For example, the power difference is proportional to the time difference. For a message Mm received at a time tm, the power difference ΔPtm determining the retransmit power Ptm (Ptm=Ptmin+ΔPtm) is, for example, determined according to the following expression:

$$\Delta Ptm = (Ptmax - Ptmin) \times (tm - t0)/\Delta T.$$

The message Mm retransmitted by the repeater device 40 is received by at least one base station 31 of the access network 30. By measuring the received power of said message received by a base station 31, an estimate is obtained of the retransmit power Ptm of this message retransmitted by the repeater device 40, give or take the propagation losses.

In the case described hereinabove, wherein the power difference between the retransmit power and the reference power is representative of the time difference between the receiving time and a reference time, several possibilities can be envisaged for determining the receiving time of the message Mm received by the repeater device 40.

Everything that has been stated hereinabove regarding the reference time is also applicable in this example.

The reference power, if not known by the access network 30, can be indicated for example in a reference message formed and transmitted by the repeater device 40. Propagation losses can be estimated using any method known to a person skilled in the art. Thus, the retransmit power Ptm of the message Mm can be estimated from the measurement of the power with which the access network 30 received the retransmitted message, and from the a priori knowledge of the propagation losses. The power difference can then be estimated to determine the receiving time tm of the message Mm received by the repeater device 40.

Alternatively, the repeater device 40 can form a reference message and transmit it directly with the reference power, for example on a frequency different from the retransmission frequency Fm of the message Mm. Such transmission of a reference message Mr with the reference power is advantageous in that it allows the access network 30 to directly measure the power difference between the reference power and the retransmit power Ptm, assuming that the propagation losses are the same for the reference message and for the retransmitted message Mm.

FIG. 6C diagrammatically shows a power frequency spectrum containing the same elements as in FIG. 6B, and which also shows a reference message Mr which is transmitted simultaneously with the retransmitted message Mm, with the reference power which corresponds in this example to the minimum retransmit power Ptmin. In this example, the reference message Mr is transmitted on the minimum frequency Fmin of the frequency band of the uplink.

C) Received Power-to-Retransmission Frequency Conversion

Figure 7A:
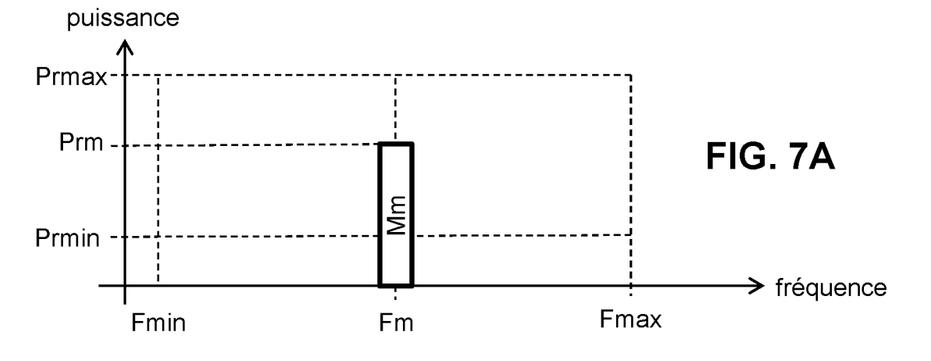

According to a third non-limiting example, the first physical property corresponds to the power with which the message is received by the repeater device 40, and the second physical property corresponds to the frequency on which said repeater device 40 retransmits said message.

Figure 7B:
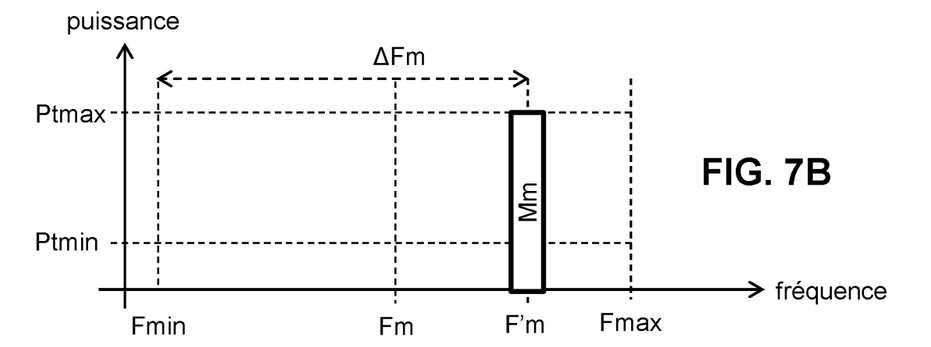
Figure 7C:
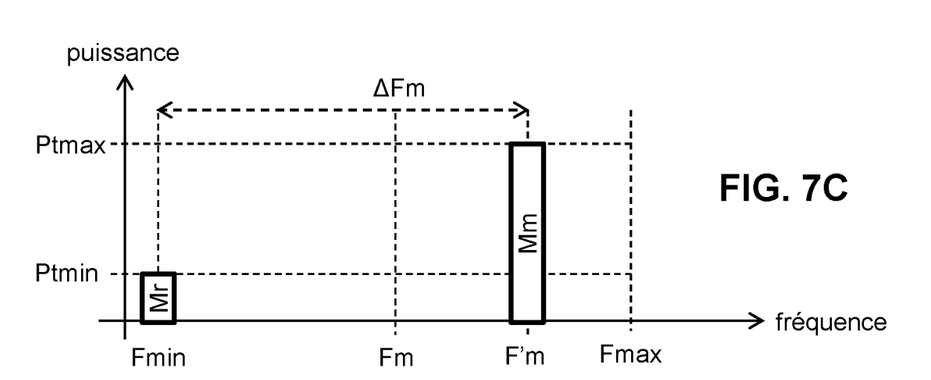

FIG. 7A-C diagrammatically show an example implementation of the received power-to-retransmission frequency conversion. More particularly, FIG. 7A shows a power frequency spectrum of the message received from a terminal 20. FIG. 7B shows a power frequency spectrum of the message retransmitted by the repeater device 40.

As shown in FIG. 7A, the repeater device 40 receives a message Mm, transmitted by a terminal 20, with a power Prm and on a frequency Fm within the frequency band of the uplink.

During the measurement step 51, the repeater device 40 measures the received power Prm of the message Mm and then determines, during the determination step 52 and as a function of the received power Prm, the frequency F'm on which said message must be retransmitted to the access network 30. The retransmission frequency F'm, which depends on the received power Prm of the message Mm, is thus usually different from the frequency Fm on which said message Mm was received by the repeater device 40. Then, as shown in FIG. 7B, the repeater device 40 retransmits the message Mm on the frequency F'm determined as a function of the power Prm.

As described hereinabove, during the determination step 52, the retransmission frequencies are determined such that two messages received with different received powers are retransmitted on different frequencies.

In preferred implementations, the retransmission frequencies of the messages are determined such that a frequency difference between a retransmission frequency of a message and a predetermined reference frequency is representative of a power difference between a reference power and the received power Prm of said message received by the repeater device 40. The reference power is, for example, the maximum received power Prmax received by the repeater device 40, the minimum received power Prmin received by said repeater device 40, or a predefined power between the maximum power Prmax and the minimum power Prmin, etc. The reference frequency is, for example, the minimum frequency Fmin of the frequency band of the uplink, the maximum frequency Fmax of the frequency band of the uplink, or a predefined frequency within the frequency band of the uplink, etc.

The description hereinbelow relates, in a non-limiting manner, to the case where the reference power corresponds to the minimum received power Prmin, and where the reference frequency corresponds to the minimum frequency Fmin of the frequency band of the uplink. For example, the frequency difference is proportional to the power difference. For a message Mm received with a power Prm, the frequency difference $\Delta Fm$ determining the retransmission frequency F'm (F'm=Fmin+$\Delta Fm$) is, for example, determined according to the following expression:

$$\Delta Fm=(Fmax-Fmin) \times (Prm-Prmin)/(Prmax-Prmin).$$

The message Mm retransmitted by the repeater device 40 is received by at least one base station 31 of the access network 30. By measuring the receiving frequency of said message received by a base station 31, an estimate is obtained of the retransmission frequency F'm of this message retransmitted by the repeater device 40. Since the retransmission frequency of the message retransmitted by the repeater device 40 has been determined from the received power Prm of said message Mm by applying a function known to the access network 30, it is thus understood that the access network 30 can estimate this received power Prm from the measurement of the receiving frequency of the message Mm received from the repeater device 40.

In the case described hereinabove, wherein the frequency difference at a reference frequency is representative of the power difference between the received power Prm and a reference power, several possibilities can be envisaged for determining, at the access network 30, the received power Prm of the message Mm received by the repeater device 40.

For example, the reference power, if not known by the access network 30, can be indicated for example in a reference message formed and transmitted by the repeater device 40.

The reference frequency, if not known by the access network 30, can be indicated for example in a reference message formed and transmitted by the repeater device 40. Alternatively, the repeater device 40 can form a reference message (which can include information useful for estimating the reference power) and transmit it directly on the reference frequency, which is within the frequency band of the uplink where appropriate. Where appropriate, the access network 30 can directly measure the frequency difference between the reference frequency and the retransmission frequency F'm, by calculating the difference between the frequencies on which the access network 30 receives the reference message and the message Mm retransmitted by the repeater device 40.

FIG. 7C diagrammatically shows a power frequency spectrum containing the same elements as in FIG. 7B, and which also shows a reference message Mr which is transmitted simultaneously with the retransmitted message Mm, on the reference frequency which corresponds in this example to the minimum frequency Fmin of the frequency band of the uplink. In this example, the reference message Mr is transmitted with the minimum retransmit power Ptmin.

D) Alternative Implementations

In more general terms, the invention is applicable to any type of conversion from a first physical property of the received message to a second physical property of the retransmitted message, provided that the second physical property is different from the first physical property.

For example, if the first physical property corresponds to the time at which the message is received by the repeater device 40, then the second physical property can be any of the following physical properties:

the frequency on which said message is retransmitted, the power with which said message is retransmitted, and the phase with which said message is retransmitted.

According to another example, if the first physical property corresponds to the power with which the message is received by the repeater device 40, then the second physical property can be any of the following physical properties:

the time at which said message is retransmitted, the frequency on which said message is retransmitted, and the phase with which said message is retransmitted.

According to another non-limiting example, if the first physical property corresponds to the frequency on which the message is received by the repeater device 40, then the second physical property can be any of the following physical properties:

the time at which said message is retransmitted, the power with which said message is retransmitted, and the phase with which said message is retransmitted.

Generally speaking, it should be noted that the implementations and embodiments considered hereinabove have been described by way of non-limiting examples, and that other alternative implementations and embodiments can thus be envisaged.

In particular, the invention has been described relative to a repeater device 40 over an uplink between terminals 20 and an access network 30 of a wireless communication system 10. However, the invention is also applicable over the downlink between the access network 30 and the terminals 20, or even in a wireless communication system 10 of the ad hoc type to allow, for example, exchanges between terminals 20, without any infrastructure of the access network 30 type. The invention can thus be generalised and relate to a repeater device 40 that retransmits messages received from transmitter devices to at least one receiver device. Over the uplink described hereinabove, the transmitter devices correspond to terminals 20 and/or to other repeater devices, whereas the receiver devices correspond to base stations 31 and/or to other repeater devices. Over the downlink described hereinabove, the transmitter devices correspond to base stations 31 and/or to other repeater devices, whereas the receiver devices correspond to terminals 20 and/or to other repeater devices.

Furthermore, in the case where a reference message is formed and transmitted by the repeater device 40, it should be noted that a single reference message can be transmitted for a plurality of retransmitted messages. For example, in the case where the repeater device 40 collects messages received throughout the entire duration of a collection window, then it is possible to transmit a single reference message with all retransmitted messages corresponding to messages received during said collection window.

Moreover, the reference message, optionally transmitted by the repeater device 40, can take any suitable form. In particular, the reference message can, in certain embodiments, take the form of an unmodulated carrier frequency (i.e., a sine-wave signal), especially when the reference message is transmitted on the reference frequency and/or with the reference power.

The invention claimed is:

1. A method for wireless communication between a transmitter device and a receiver device via a repeater device, the transmitter device transmitting a message in a frequency band which is received by the repeater device, the repeater device retransmitting the message in the frequency band to the receiver device, the method comprises:

measuring, with the repeater device, a value of a first physical property of the message received from the transmitter device;

determining, with the repeater device and as a function of the value of the first physical property measured for the message, a value of a second physical property to be used for the retransmission of the message, the second physical property being different from the first physical property; and retransmitting, with the repeater device, the message to the receiver device, using the value of the second physical property.

2. The method of claim 1, wherein the value of the second physical property of the message retransmitted is determined such that a difference between the value of the second physical property of the message retransmitted and a predetermined reference value of the second physical property is representative of a difference between a reference value of the first physical property and the value of the first physical property measured for the message received.

3. The method of claim 2, further comprising forming and transmitting, with the repeater device, a reference message using the predetermined reference value of the second physical property.

4. The method of claim 1, further comprising:

measuring, with the receiver device, the value of the second physical property of the message received from the repeater device; and determining, with the receiver device, the value of the first physical property of the message received by the repeater device as a function of the value of the second physical property measured for the message received by the receiver device.

5. The method of claim 1, wherein the first physical property is a time at which the message is received by the repeater device; and the second physical property is one of the following physical properties: a frequency on which the message is retransmitted; a power with which the message is retransmitted; and a phase with which said message is retransmitted.

6. The method of claim 1, wherein the first physical property is a power with which the message is received by the repeater device; and the second physical property is one of the following physical properties: a time at which the message is retransmitted; a frequency on which the message is retransmitted; and a phase with which the message is retransmitted.

7. The method of claim 1, wherein the first physical property is a frequency on which the message is received by the repeater device; and the second physical property is one of the following physical properties: a time at which the message is retransmitted; a power with which the message is retransmitted; and a phase with which the message is retransmitted.

8. A repeater device configured to receive a message transmitted in a frequency band by a transmitter device and to retransmit the message in the frequency band to a receiver device, the repeater device comprising:

a processing circuit to measure a value of a first physical property of the message received from the transmitting device and to determine, as a function of the value of the first physical property measured for the message, the value of a second physical property to be used for retransmission of the message, the second physical property being different from the first physical property; and a transmitter to retransmit the message to the receiver, using the value of the second physical property determined as a function of the value of the first physical property.

9. The repeater device of claim 8, wherein the processing circuit is configured to determine the value of the second physical property of the message retransmitted such that a difference between the value of the second physical property of the message retransmitted and a predetermined reference value of the second physical property is representative of a difference between a reference value of the first physical property and the value of the first physical property measured for the message received.

10. The repeater device of claim 9, wherein the processing circuit is configured to form a reference message using the predetermined reference value of the second physical property; and wherein the transmitter is configured to transmit the reference message.

11. A wireless communication system comprising a receiver device and a repeater device of claim 8, wherein the receiver device comprises a processing circuit configured to:

measure a value of the second physical property of the message received from the repeater device; and determine the value of the first physical property of the message received by the repeater device as a function of the value of the second physical property measured for the message received by the receiver device.

* * * * *